Nov. 30, 1965  H. W. MERGLER ET AL  3,220,260
AIRCRAFT ALTIMETER SYSTEM
Filed June 15, 1961  7 Sheets-Sheet 1

INVENTORS.
HARRY W. MERGLER
BY WILLIAM L. WESTON

Schramm, Kramer & Sturges
ATTORNEYS.

FIG. 2

Nov. 30, 1965 H. W. MERGLER ETAL 3,220,260
AIRCRAFT ALTIMETER SYSTEM
Filed June 15, 1961 7 Sheets-Sheet 3

INVENTORS.
HARRY W. MERGLER
BY WILLIAM L. WESTON

ATTORNEYS.

Nov. 30, 1965   H. W. MERGLER ETAL   3,220,260
AIRCRAFT ALTIMETER SYSTEM
Filed June 15, 1961   7 Sheets-Sheet 6

INVENTORS
HARRY W. MERGLER
BY WILLIAM L. WESTON
Schramm, Kramer & Sturges
ATTORNEYS.

United States Patent Office 3,220,260
Patented Nov. 30, 1965

3,220,260
AIRCRAFT ALTIMETER SYSTEM
Harry W. Mergler, Cleveland, and William L. Weston, Euclid, Ohio, assignors to Case Institute of Technology, Cleveland, Ohio
Filed June 15, 1961, Ser. No. 117,460
9 Claims. (Cl. 73—384)

This invention relates to data transmission systems, altimeter-reading encoding apparatus, aircraft altitude identification systems and aircraft safety systems.

An object of the invention is to prevent aircraft collisions and to enable control tower operators to locate aircraft accurately both in altitude and azimuth as well as to identify the aircraft located.

A further object of the invention is to relieve pilots of routine verbal communications with control towers, to enable control tower operators to locate and identify aircraft without manipulation of instruments and without exchange of voice or other messages with pilots and to provide visual or other displays of aircraft identification and location without action on the part of the control tower operator in order to leave the control tower operators' faculties free for warning aircraft approaching hazardous locations.

Another object of the invention is to provide an altimeter with mechanism for producing binary signals of its altitude reading.

Another object of the invention is to provide a system for enabling an altimeter to record its reading co-ordinated with a record of the location of the aircraft carrying the altimeter in azimuth.

Still another object of the invention is to provide a radio, altitude telemeter which transmits readings of altitude in response to trigger signals co-ordinated with the location in azimuth of the aircraft.

Still another object of the invention is to provide a reading-transmitting altimeter which includes in its transmission a signal identifying the aircraft.

A further object of the invention is to provide an improved analog to digital converter.

Another object of the invention is to provide a highly compact analog to digital converter which places no load on the analog-quantity measuring device.

Other and further objects, features and advantages of the invention will become apparent as the description proceeds.

In carrying out the invention in accordance with the preferred form thereof, mechanism for identifying an aircraft and locating it in altitude is used in conjunction with a radio control tower for a landing field having a rotating standard carrying a radar transmitter employing a receiver system for providing plane position indication or indication of azimuth upon an oscilloscope screen.

In addition to the radar system, the control tower is provided also with a radio pulse transmission and reception system having antenna means rotating with the radar standard with a beam which is very narrow in azimuth. All aircraft permitted to fly in vicinity of the control tower are provided with radio transmission and reception equipment co-operating with the pulse transmission and reception equipment at the control tower and an altimeter which transmits a radio signal indicating the altitude reading in response to reception of pulse signals from the control tower transmitter.

In this manner when the aircraft is in the angular position producing an indication of its presence in azimuth on the screen of the radar plan position indicator, a signal is also transmitted to the control tower receiver indicating the altitude of the aircraft. Alternatively, a radar scanner system may be employed for locating all approaching aircraft and locking the rotating, pulse-transmission antenna on each aircraft until its identity and altitude signals have been received. Means actuated by the control tower receiver are provided for producing a display showing the altitude and identity of the aircraft in order that the control tower operator will have before him a record of the identity and altitude of each aircraft corresponding to a blip on the screen of the radar plan position locator.

In order that no mechanical load will be placed upon the altimeter carried by the aircraft and highly accurate precise signals indicative of altitude reading may be transmitted to the control tower, the rotating shaft of the altimeter, the angular position of which indicates altitude, is provided with a binary-coded disk co-operating with photoelectric means and a flashing lamp. The lamp is flashed at intervals by the pulse transmitter of the control tower while the aircraft is in the beam of the rotating standard of the control tower and a digital radio pulse signal is transmitted back to the control tower. In conjunction with the digital signal produced by the light beams transmitted through the coded disk, an identification signal storage device is provided which causes a digital signal to be transmitted together with the altiture signal for identification of the aircraft corresponding to each altitude signal received by the control tower.

A better understanding of the invention will be afforded by the following detailed description considered in conjunction with the accompanying drawing in which.

Like reference characters are utilized throughout the drawing to designate like parts.

In order to achieve safety in the vicinity of heavily travelled air lanes and landing fields, and provide a traffic control officer with information as to the altitude and identity of the aircraft in the vicinity, certain additional equipment is installed at the control towers and also upon each aircraft permitted to fly in the vicinity.

Figure 1:
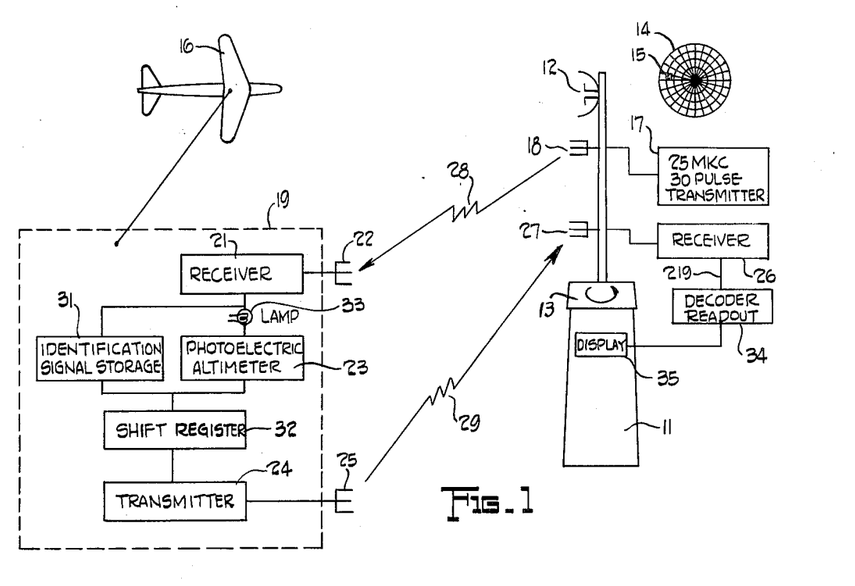
FIG. 1 is a schematic diagram illustrative of the relationship between the components of the system and their function.

Control towers such as a schematically indicated control tower 11 are now conventionally provided with radar, aircraft-locating apparatus including a radar antenna or dish 12 rotating with a rotating standard 13 and connected to suitable apparatus so as to provide, upon an oscilloscope screen 14, a blip or illuminated spot 15 providing an indication in azimuth and if desired also in range of the location of an aircraft 16 as a result of the reception of reflected radar waves when the antenna or parabolic dish 12 is in a predetermined annular position represented by the angular position or azimuth of the spot 15 on the screen 14. So-called plan position indicators are available which merely indicate the location of an aircraft in plan. Search scanners are also available which lock in on an aircraft after it has been located and cause the antenna or dish 12 to track the aircraft instead of rotating continuously.

In addition to the conventional equipment the control tower is provided with a directional transmitter 17, preferably a narrow beam pulse transmitter and approximately three degrees beam width, for example, operating at high frequencies such as 25,000 megacycles in which very narrow beam widths may be achieved. The pulse transmitter 17 is provided with a suitable antenna 18 schematically indicated in FIG. 1 which rotates on the same standard 13 as the radar antenna or dish 12 so that it tracks therewith and directs pulses toward the same aircraft 16 as that which produces the azimuth location indications 15.

The usual apparatus on the aircraft 16 is also supplemented by a mobile unit 19 which includes a receiver 21 tuned to the frequency of the pulse transmitter 17 so as to be responsive thereto, having an appropriate antenna 22. The mobile unit includes also an altimeter 23 arranged to produce altitude indications whenever an interrogation pulse is transmitted by the transmitter 17 and received by the receiver 21. For returning such altitude indication to the control tower 11 there is a transmitter 24 responsive to the altimeter 23 with a suitable antenna 25. On the ground or at the control tower 11 there is a receiver 26 tuned to the output of the transmitter 24 so as to be responsive to the altitude signals. The receiver 26 likewise has a suitable antenna 27 which is highly directional with a narrow beam and is mounted upon the same rotating standard 13 as the transmitter antenna 11 and the radar dish 12. For convenience in the explanation a radio link 28 has been assumed between the transmitting antenna 18 and the receiving antenna 22, separate from the return radio link 29 between the transmitting mobile antenna 25 and the receiving control tower antenna 27. It will be understood, however, that the invention is not limited to the use of separate transmitting and receiving antennae.

In order that the identity and type of the aircraft may be transmitted as well as its altitude, the mobile unit 19 preferably includes also an identification signal storage unit 31. For convenience in handling the data at high speed it is preferably in digital form and a shift register 32 is provided for supplying appropriate pulse signals to the transmitter 24 from the identification signal storage unit 31 and the altimeter 23. Since altimeters are relatively delicate instruments which provide indications in analog form, an analog to digital converter of the type which imposes no mechanical load upon the altimeter is employed. This preferably takes the form of a translucent coded disk mounted in the altimeter co-operating with a lamp 33, the illumination of which is triggered in accordance with the signals received by the receiver 21 and converted to digital signals by photoelectric elements co-operating with the coded disk and the photoelectric altimeter 23, as will be described in greater detail hereinafter.

For the convenience of the control tower operator the receiver 26 at the control tower is also provided with a decoder or read-out device 34 actuating a visual display device 35 which provides the control tower operator with a display in figures or letters as desired showing the altitude and identity of the aircraft 16, including if desired information as to the type of the aircraft and numerical identification means such as its serial number or the serial number of the mobile unit 19 mounted thereon.

Figure 2:
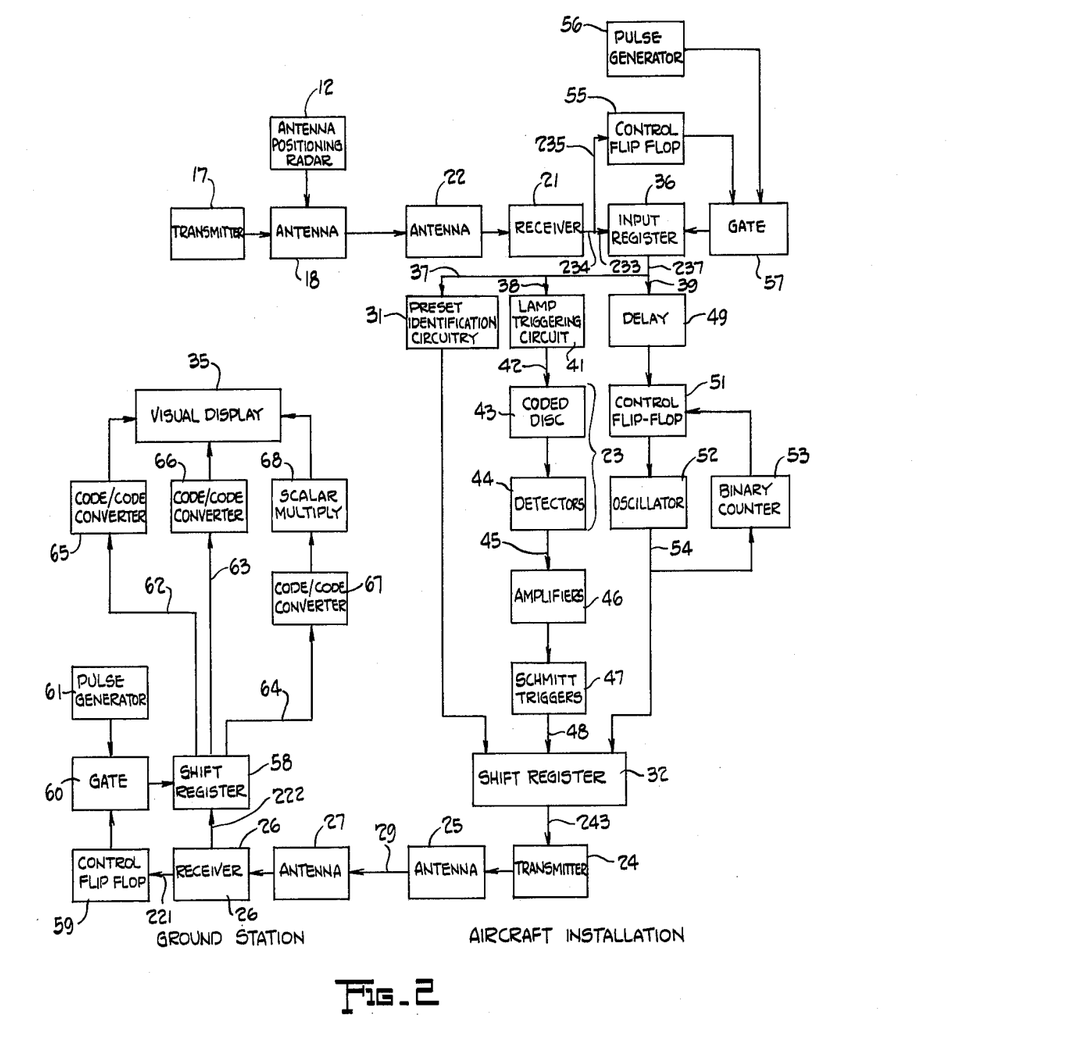
FIG. 2 is a block diagram of the components employed in the aircraft safety system of FIG. 1.

The components of the apparatus employed in the system of FIG. 1 and the functional relationship therebetween are shown in greater detail in the block diagram of FIG. 2. As shown in FIG. 2 the output of the airborne receiver 21 is supplied to an input register 36 having three output channels 37, 38 and 39. Preset identification circuity 31 comprising manual switches is interposed in the output channel 37 to the shift register 32. Interposed in the output channel 38 to the shift register 32 are the following units: a circuit 41 for triggering the lamp 33 of FIG. 1 having a light output channel 42, a binary or digitally coded disk 43 included in the photoelectric altimeter 23 of FIG. 1, a bank of photo responsive detector units 44 having a multiple electrical output channel 45, a bank of Schmitt triggers 47 corresponding in number to the amplifiers 46 with output channels 48 to successive stages of the circuity in the shift register 32, a bank of amplifiers 46 corresponding to the number of detectors 44.

The output channels 37 and 38 from the input register 36 to the shift register 32 serve for inserting the desired information into the shift register 32, whereas the channel 39 from the register 36 to the shift register 32 is provided for limiting the number of pulses supplied to the shift register to the capacity of the shift register 32. The channel 39 includes a delay device 49, a control flip-flop 51, and an oscillator 52 for providing shifting pulses to the shift register 32 for shifting out the information therefrom to the transmitter 24. There is a binary counter 53 in a feedback loop from the output channel 54 of the oscillator 52 to the control flip-flop 51 for counting out the number of shifting pulses to correspond to the number of stages of the shift register 32 and thereafter terminating the output of pulses from the oscillator 52.

In a simple system, where it is acceptable to actuate the shift register from any single pulse received by the antenna 22 and the narrowness of the beam of the antenna 22 and the direction from which the pulse is received are solely relied upon for the requisite selectivity, the output of the receiver 21 may be fed directly to the output channels 37, 38 and 39. However, where greater selectivity is desired apparatus for coding an interrogational signal may be provided as described more fully in connection with the explanation of FIG. 11 of the drawings. The mechanism for coding the interrogation signal includes the input register 36 incorporating the desired code, a control flip-flop 55 and a pulse generator 56 supplying pulses to the input register 36 through a gate 57 responsive to the control flip-flop 55.

The apparatus at the ground station or control tower 11 for actuating the visual display 35 from the ground station antenna 27 and the receiver 26 includes elements somewhat complementary to those employed in the airborne mobile unit. There is a shift register 58 for receiving pulses from the receiver 26 and mechanism for shifting the information into the shift register 58 including a control flip-flop 59 actuated by the output of the receiver 26, a pulse generator 61 and a gate 60 responsive to the control flip-flop 59 and the pulse generator 61 for supplying control shifting pulses to the shift register 58. Successive portions of the shift register 58 have banks of output channels 62, 63 and 64 for feeding information from the shift register 58 to the portions of the visual display 35 representing type of aircraft, serial number or other identification and altitude respectively. Binary-gray code converter 65 and binary-decimal code converters 66 and 67 are included in the channels 62, 63 and 64 respectively, and preferably a fifty-times multiplier 68 is included in the altitude information channel 64 in order that the visual display of altitude will be in terms of the actual number of feet. The multiplier is the number of feet in each level of differentiation of the photoelectric altimeter 23 as provided by capacity of the coded disk 43. In this manner the altitude is read from the display 35 in feet rather than a code number.

Figure 11:
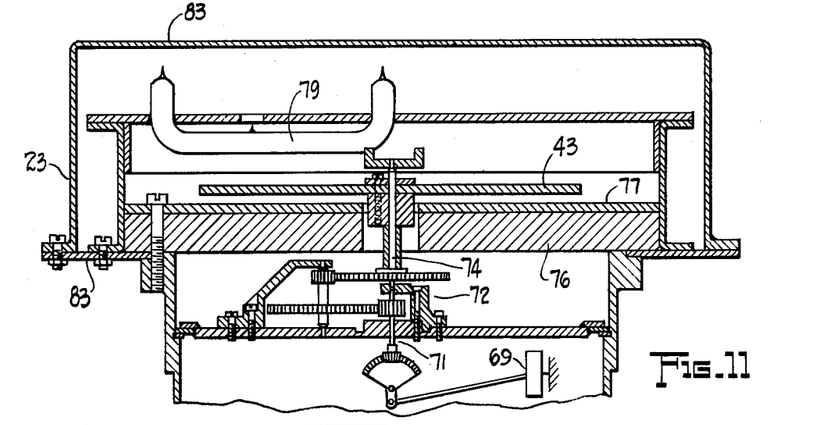
FIG. 11 is a view in elevation and partially in cross-section of the digital reading altimeter.

As shown in FIG. 11 the altimeter 23 employs a conventional movement of the aneroid type having a flexible vacuum-box wall or diaphragm 69 connected through suitable conventional linkage, rack and gears to a shaft 71 which in a standard model aircraft altimeter makes a full revolution for every thousand feet of change of altitude. In order to accommodate the altimeter to the illustrative system designed for reporting to the control tower altitude of any aircraft within 25,000 feet of ground, 25 to 1 reduction gearing 72 is interposed between the shaft 71 and the coded disk 43 carried on a shaft 74.

The disk 43 is translucent or transparent and coated preferably by photographic process with an opaque material in the proper pattern 73 (FIG. 10) to provide successively coarser subdivisions representing a digital code so that the coded disk pattern 73 serves as an analog to digital converter for converting an analog measurement in rotation to a digital reading. For efficiency in the electrical circuitry a binary type of code is preferably employed with each row of the pattern 73 of the disk 43 going outward having twice as many subdivisions as the row within. Rather than a true binary code, preferably the gray code is employed in order to avoid abrupt changes in digital reading for small discrepancies in positional alignment and in order to prevent changing more than one digit at a time with progressively increasing or decreasing readings as described in Patent 2,632,058, issued March 17, 1953 to Frank Gray, describing a modified pattern for the mask to represent what is called a reflected binary code.

Figure 10:
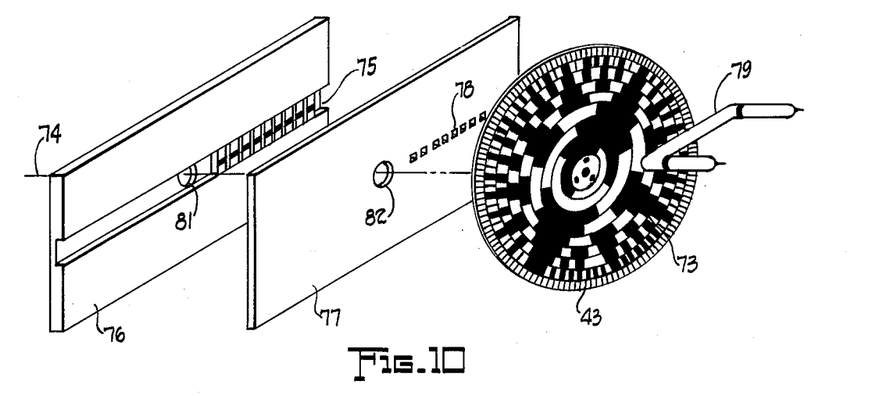
FIG. 10 is a perspective view of the analog digital converter for supplying digital information from the movement of an aneroid altimeter.

By way of example, it is assumed that altitude indications are desired throughout a range of 25,000 feet with fifty-foot accuracy or distinction among 500 different 50 foot levels. The coded disk pattern 73 must therefore have nine rows to cooperate with nine one-bit detectors since the ninth power of two is 512 and the eighth power would be only 256. Accordingly, nine photo-detectors 75 are mounted in a detector plate 76. In order to avoid possible errors due to reflections, parallax or divergence of light beams, a light focussing window 77 is interposed between the detector plate 76 and the coded disk 43 with nine separate apertures 78, each aligned with one of the detectors 75 over the detector plate 76 and one of the rows of the coded disk pattern 73. An elongated light source 79 is provided having a length at least as great as the radius of the coded disk 43. As shown, the coded disk 43 is interposed between the detector plate 76 and the light source 79, and the light focussing window plate 77 in turn is interposed between the detector plate 76 and the coded disk 43, the plates 76 and 77 having openings 81 and 82 to receive the altimeter disk shaft 74.

The light source 79 may take any suitable form capable of illuminating a radial segment of the disk 43 and capable of providing short impulses of high intensity illumination. A suitable type of lamp, for example, is a neon filled gaseous discharge lamp of the type used for stroboscopes, such as that sold under the trade name Sylvania Strobotron Model S-838.

The light sensitive detectors 75 are preferably of a highly sensitive type which may be formed in small sizes and closely spaced. A suitable type comprises lead sulfide detectors deposited on glass bases such as those sold under the trade name Kodak Ektron detectors. They are type P, multiple array detectors, each 2.0 mm. x 0.5 mm., with dark resistance 200K to 270K and light saturation resistance 140K to 200K at approximately nine volts bias. Their function is to act as pure Ohm's-law resistors but with changes in resistance due to changes of irradiance. These detectors are not subject to microphonics and exhibit no diode effect. Their response to tungsten illumination is of roughly the same order as emissive-type phototubes of the same sensitive area.

It will be understood that the optical elements are mounted within walls 83 of a light-tight housing. As the aircraft 16 changes altitude, the altimeter output shaft 74 and consequently the coded disk 43 rotate between the housing walls 83 containing the light source 79 and the detector plate 76. Mechanism is provided for causing the light source 79 to flash momentarily and thereby expose some of the detectors (depending upon which detector cells were in direct view of the light source 79 and which were hidden by opaque areas of the disk 43).

Figure 9:
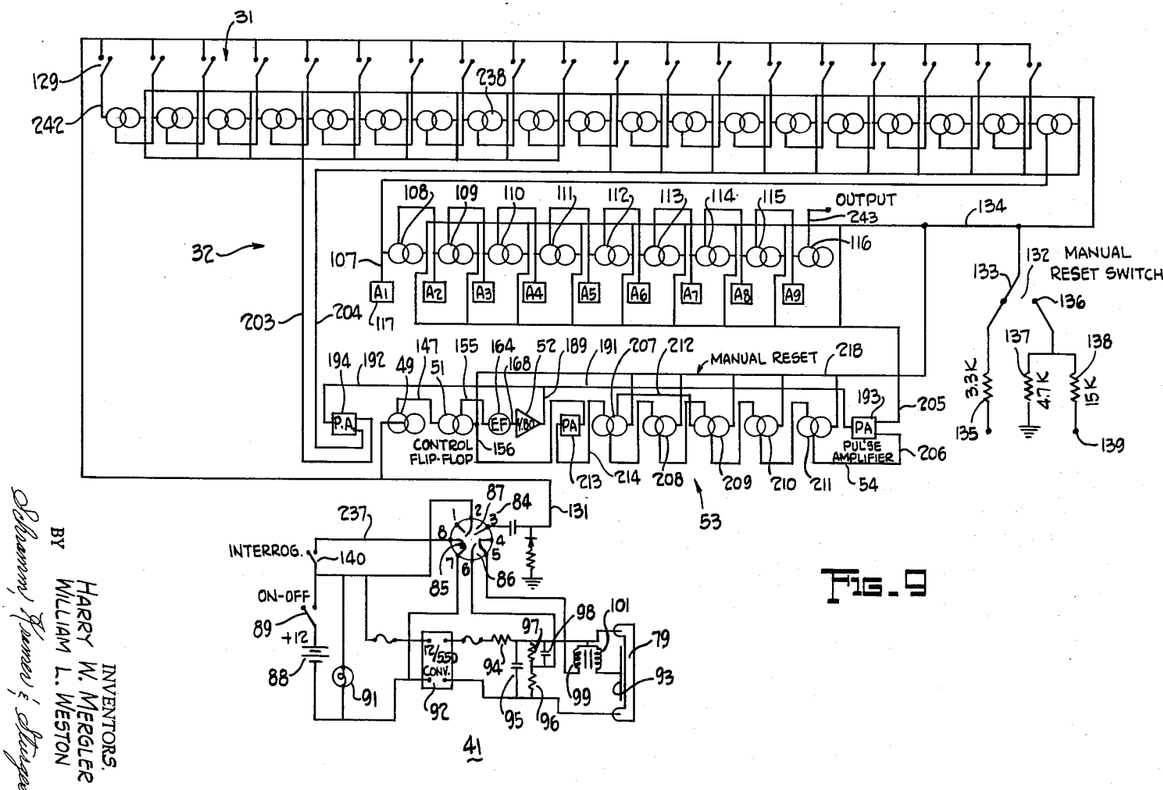
FIG. 9 is a schematic diagram of a shift register for temporary storage of identification and altitude data with a binary counter for terminating shift-out at the proper time, and a lamp triggering circuit for synchronizing the input of altitude information with identification in the shift register.

For producing flashes from the light source 79 a lamp triggering circuit 41 is provided as illustrated in FIG. 9 comprising a mercury-wetted contact relay 84 having an actuating coil 85 energized by suitable source of current such as a direct current 12-volt battery 88 in response to signals from the receiver 21 which through a relay (not shown) close interrogation-signal switch contacts 140. For turning the system on or off, a manual switch 89 is provided and there is a warning light 91 connected across the battery 88 in series with the switch 89 for indicating whether the system is turned on or off. When a strobotron type of discharge lamp is employed requiring a relatively high voltage for operation, a D.-C. to D.-C. stepup voltage convertor 92 is provided having a voltage ratio for the example assumed of 12 to 550 volts with a low voltage side connected to the battery 88 in series with the manual switch 89 and a secondary side connected to the main electrodes of the lamp 79. Such lamps in the example assumed are of the type employing an external electrostatic starting electrode or plate 93 and the starting plate 93 is included in a starting circuit controlled by the normally open contacts 86 of the relay 84. The starting circuit includes a charge storing condenser 95 of relatively high capacity such as one microfarad, for example, connected across the secondary side of the converter 92 in series with a current limiting resistor 94, a voltage dividing circuit including resistors 96 and 97 connected in series across the condenser 95, a starting impulse supplying condenser 98 connected across the resistor 97 and a transformer or induction-coil having a primary winding 99 and a secondary winding 101. The primary winding 99 is connected across the condenser 98 in series with the normally open contacts 86 of the relay 84; and the secondary winding 101 is connected between the starting electrode or plate 93 and one of the main electrodes of the light source 79.

Figure 13:
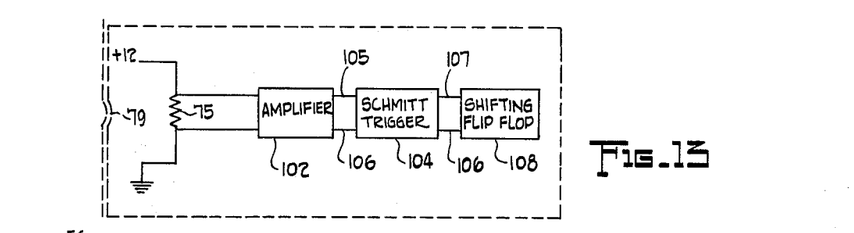
FIG. 13 is a circuit diagram of the photoelectric circuit and block diagram of immediately associated elements employed in the system of FIGS. 1 and 2.

Since each of the detector elements 75 is constantly biased, the exposed elements will cause a change in voltage output of their respective circuits. Because this change will be in the neighborhood of millivolts, suitable transistorized amplifiers 102 are connected to each detector circuit output as represented schematically in FIG. 13.

The function of each of the windows 78 mounted in the window plate 77 and between the plate 76 and the coded disk 43 is to insure that any light which falls upon the detectors is that which has already passed through the proper radial segment of the disk. In this manner correction is provided for any possible misalignment of the detectors and the windows also help to eliminate crosstalk between zones.

Since a detector output is essentially linear (up to the point of saturation) both before and after amplification, decision making circuits are provided for the case in which a coded pattern crossover is being viewed by any given detector. For this purpose as decision making circuits Schmitt triggers may be employed. Their function is to generate an output signal for input equal to or greater than a preset voltage threshold.

Figure 12:
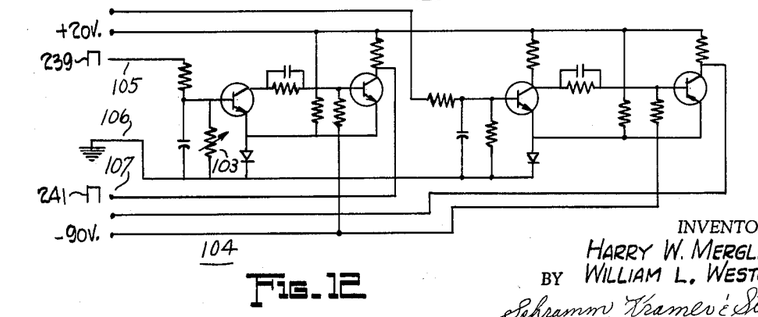
FIG. 12 is a circuit diagram of Schmitt trigger employed in the system of FIGS. 1 and 2.

As shown in FIG. 12 each triggering circuit is provided with a potentiometer 103 which allows for fine adjustment of the threshold level. Since each detector provides a certain output when unexposed to light and a different output when saturated by light, it is assumed that the threshold level will be given by the direct average of the limiting outputs after suitable amplification.

The potentiometers 103 are individually adjusted so that threshold level is at this average point for each detector. Each Schmitt trigger circuit 104, which may be of conventional transistorized type as provided by Computer Controls Company plug-in cards, has a positive input conductor 105 from the amplifier 102, a grounded input conductor 106 and a positive output conductor 107, the remaining output conductor also being grounded to the ground line 106.

Each of nine Schmitt triggers 104 corresponding to one of the nine assumed light detectors 75 is connected to one of nine flip-flops forming the altimeter or altitude signal indicating section of the shift register 32.

The nine flip-flops in question are represented schematically in FIG. 9 and designated by reference numerals 108 through 116. In FIG. 9 each of the rectangles such as the rectangle 117 represents schematically the assembly of light responsive elements of FIG. 13 including the light detector 75, amplifier 102, Schmitt trigger 104. The output of each such trigger circuit is thus fed to the proper shifting flip-flop (set input) and thereby allows for placing a coded "1" in a proper position when the associated detector so dictates.

Figure 3:
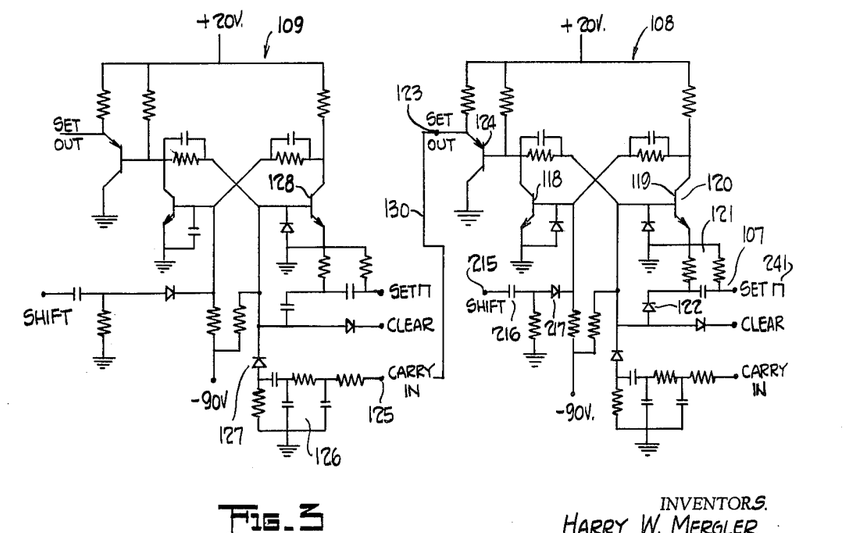
FIG. 3 is a circuit diagram of a shifting flip-flop employed in the apparatus of FIGS. 1 and 2.

Each of the shifting flip-flops in the shift register 32 employs the internal circuits which are illustrated in FIG. 3 showing two of the flip-flop units 108 and 109. The shifting flip-flops employed in the shifts register 32 are of the type including built-in delay elements on the carry-in or set side of the shifting flip-flop. This circuity makes unnecessary the inclusion of separate delay units between stages of the shift register.

As shown in FIG. 3 the shifting flip-flop 108 includes a pair of grounded emitter NPN transistors 120 and 118 with the base 119 of the "1" transistor 120 connected to a set in terminal 107 through a resistance-capacity delay network 121 and a rectifier element 122. The rectifier element 122 is so connected as to be conducting with respect to positive pulses in the path from the set in terminal 107 to the base 119.

The output or "0" transistor 118 is coupled to a set out terminal 123 through an additional PNP transistor stage 124 of the grounded collector type having an emitter connected to the set out terminal 123.

The shift flip-flops are coupled from one stage to the next through carry-in terminals, thus the cascading between stages 108 and 109 takes place through the conductor 130 connecting the set out terminal 123 of the stage 108 to a carry-in terminal 125 of the stage 109. The carry-in terminal 125 is connected through a resistor-capacity delay network 126 and a rectifying element 127 to the base 128 of the "1" transistor of the stage 109. The rectifier element 127 is so connected as to be conducting with respect to positive pulses in the path from the carry-in terminal 125 to the base 128.

In the manner explained, when the interrogation signal flashes the lamp 79, the altitude information is set into the altitude stages 108 to 116 inclusive of the shift register 32. In a similar manner the interrogation signal sets the remaining stages of the shift register 32, which are, however, preset by means of manual switches 129 since the identification and type information are fixed and remain unchanged during the operation of the aircraft. In practice, closed connections would be substituted for switches for those stages where the digit "1" was required and connections would be omitted for the stages where the digit "0" was required.

For simplicity in the explanation of the operation of the apparatus, it is assumed that the interrogation signal takes the form of a single voltage pulse which supplies currents from the receiver 21 directly, or indirectly through a relay, or through the input register 36 to the coil 85 of the mercury wetted contact relay 84. In FIG. 9 the energizing effect of the receiver output pulse is represented schematically by a switch 140 closing to supply current from the battery 88 to the coil 85 whenever an interrogation signal is received from the receiver 21. As shown in FIG. 9 when the coil 85 is energized it also closes the normally open contacts 87 of the relay 84 so as to place a positive pulse on conductor 131 which is connected through whichever of the manual presetting switches 129 are closed to the set in terminals of the identification flip-flops in the shift register 32.

The shift register, as will be explained more fully hereinafter, is so arranged as to be reset for another reading after each reading has been set into it. However, to make sure of having all stages properly set when the system is placed in operation, a manual reset switch 132 is provided having a normally closed contact 133 for normally grounding a reset line 134 or connecting it to a suitable bias potential through a resistor 135 and having a normally open contact 136 connected to a point of suitable potential at the junction of resistors 137 and 138 forming a potentiometer grounded at one end and connected to a source of suitable negative potential at the opposite end 139.

Means are provided for shifting the information out of the shift register 32 after the altitude and identification information have been placed in the shift register by the action of the mercury wetted contact relay 84 as previously explained. To accomplish the shift out, a new interrogation pulse is provided after a predetermined time delay. For this purpose the delay device 49 of FIG. 2 is provided which may take the form of a monostable multivibrator having a normal output constituting a positive voltage level so that when triggered by an arriving interrogation signal its output drops to zero. The monostable multivibrator 49 is so arranged that its output returns to a positive level after a predetermined period of time, which in the example described may be 175 microseconds. Thus the control flip-flop 51 which is sensitive at its set input terminal to a positive increase in voltage serves as an effective switch after a specified amount of time has elapsed.

Figure 7:
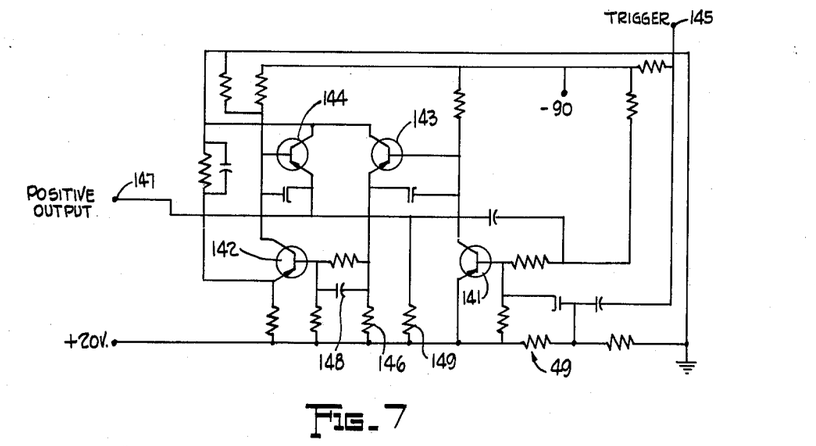
FIG. 7 is a circuit diagram of a monostable multivibrator employed in the system as a delay unit.

As shown in FIG. 7 the internal circuits of the monostable multivibrator or delay device 49 include a pair of PNP transistors 141 and 142 with amplifying stages 143 and 144, respectively. There is a positive trigger input terminal 145 for rendering the transistor stage 141 non-conductive and the transistor 143 conductive, thereby producing a voltage drop in the resistor 146 and driving the transistor 142 conductive and the transistor 144 non-conductive so as to reduce the normally positive potential at the terminal 147 to ground potential. After a predetermined time delay determined by the circuit constants, the condenser 148 is recharged so that the circuit is transferred from the transistor 142 to the transistor 141, the transistor 144 again becoming non-conducting so that the terminal 147 rises to a positive potential by reason of its connection to the positive terminal through the resistor 149.

Figure 4:
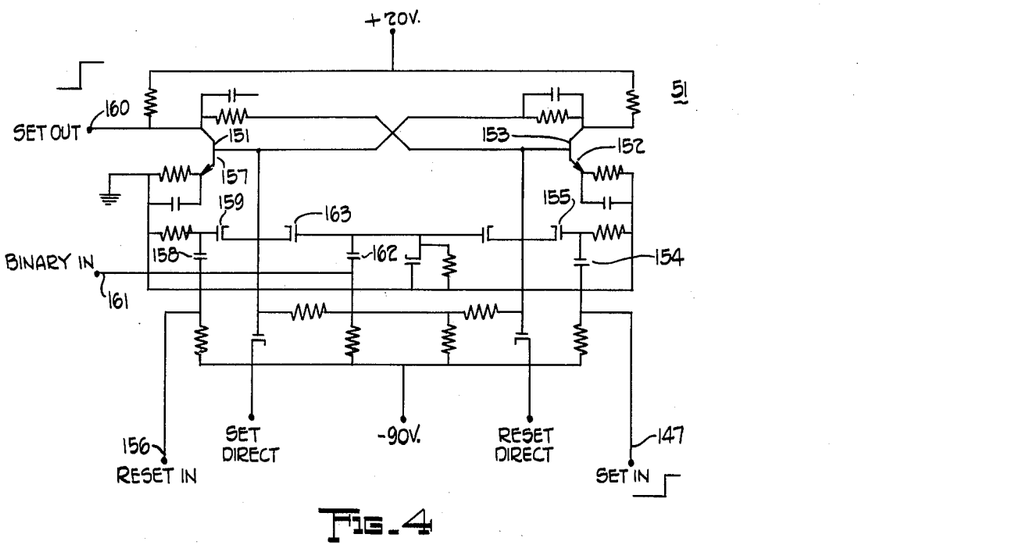
FIG. 4 is a circuit diagram of a control flip-flop employed in the system of FIGS. 1 and 2.

The positive output terminal 147 of the monostable multivibrator or delay device 49 of FIG. 7 serves as a set in terminal of the control flip-flop 51, the internal circuits of which are illustrated in FIG. 4. The control flip-flop 51 includes a pair of NPN transistors 151 and 152 with the set in terminal 147 coupled to the base 153 of the transistor 152 through a condenser 154 and a rectifier 155. The control flip-flop 51 thus serves as a switch responsive to the positive impulse received at the set in terminal 147 for switching the current flow from the transistor 151 to the transistor 152 and causing a positive voltage impulse to appear at the set out terminal 160. The control flip-flop 51 is provided also with a reset terminal 156 coupled to the base 157 of the transistor 151 through a condenser 158 and a rectifier 159. If desired, a separate binary input terminal 161 may be provided which is coupled to the base 151 through a condenser 162 and a rectifier 163.

Once the delay output has caused the control flip-flop 51 to conduct in the set state (one of its two stable states), the sequencing necessary for shifting out the information contained in the shift register 32 is begun.

Figure 6:
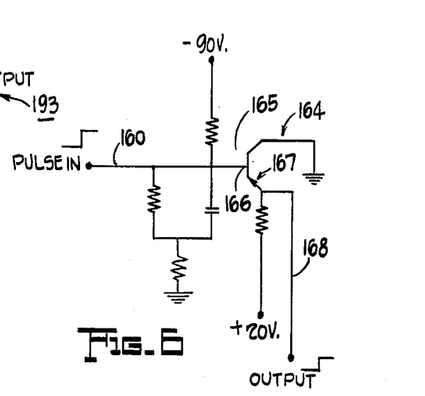
FIG. 6 is a circuit diagram of an emitter follower employed in the system.

Preferably an emitter follower 164 is interposed between the control flip-flop 51 and the variable frequency blocking oscillator 52 as shown in FIG. 9. The emitter follower 164 as shown in FIG. 6 comprises a PNP transistor 165 with a base 166 connected to the set out terminal 160 of the control flip-flop 51. The transistor 165 has an emitter 167 connected to an output terminal 168 serving as the input terminal of the variable frequency blocking oscillator 52.

The variable frequency blocking oscillator 52, capable of electronic "on-off" control, is the source of pulses required for shifting the contents of the shift register 32 into the transmitter 24.

Figure 8:
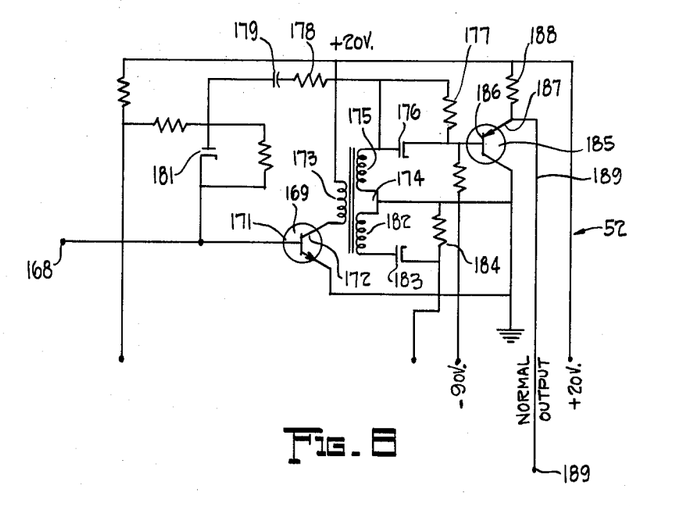
FIG. 8 is a circuit diagram of a variable frequency blocking oscillator employed in the system.

The blocking oscillator 52 (FIG. 8) includes an NPN transistor 169 of the 2N167 type, for example, having a base 171 connected to the input terminal 168 and a collector 172 connected in series with the primary winding 173 of a pulse transformer 174 with a secondary winding 175 coupled back to the base 171 through a resistor 178, a condenser 179 and a rectifier 181. The winding 175 is connected in the base-collector circuit of a transistor 185 through a rectifier 176 by-passed by a resistor 177. The transformer 174 also has a secondary winding 182 across which a rectifier 183 and a resistor 184 are connected. The rectifier 183 is poled oppositely to the rectifier 176. For amplifying the pulse from the secondary winding 175, the transistor stage 185 is provided comprising a PNP transistor with a base 186 connected to the pulse transformer winding 175 through the rectifier 176 and an emitter 187 connected to a load resistor 188. The emitter 187 is connected to an output terminal 189. The use of a blocking oscillator has the advantage of avoiding loss or miscount of the first pulse. It will be understood, however, that the invention is not limited to the use of a blocking oscillator as a pulse source and does not exclude the use of a clock, other form of pulse generator, or even a free-running multivibrator, properly equipped with either an electronic on-off control or a gated output.

Figure 5:
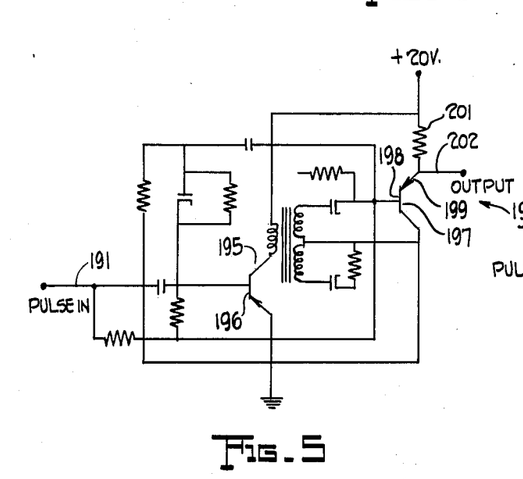
FIG. 5 is a circuit diagram of a pulse amplifier employed in the system.

Branch output conductors 191 and 192 are connected to the pulse source output terminal 189 for connection to input terminals of pulse amplifiers 193 and 194, the outputs of which are supplied to different portions of the shift register 32. The internal circuits of the pulse amplifiers 193 and 194 are shown in FIG. 5. Each such pulse amplifier includes a PNP first stage transistor 195 having a base 196 capacity coupled to the input conductor line 191 and a second stage PNP transistor 197 having a base 198, transformer coupled to the first stage transistor 195, and an emitter 199 connected in series with a load resistor 201 with an output terminal 202 connected to the emitter 199.

The pulse amplifier 194 has branched output conductors 203 and 204 (FIG. 9) connected to shift terminals of shifting flip-flops in different sections of the shift register 32. The pulse amplifier 193 likewise has branch output conductors 205 and 206. The output conductor 205 is connected to shift terminals of shifting flip-flops 108 to 116 inclusive into which the reflected binary digits are fed by the altimeter coding disk and photosensitive circuit. The pulses supplied through the line 205 serve for shifting the altimeter reading out of the shifting flip-flops 108 to 116 after the requisite time delay. The conductors 203, 204 and 205 are connected to shifting terminals of the shifting flip-flops.

The binary counter 53 comprises five stages of standard flip-flops and circuits similar to those illustrated in FIG. 4, namely, flip-flops 207, 208, 209, 210 and 211. There is a conventional feedback connection 212 from the flip-flop stage 207 to the flip-flop stage 209 to cause the counter 53 to count out 28 pulses before spilling over since 28 stages of flip-flops are included in the shift register 32 illustrated. Preferably a pulse amplifier 213 is interposed between the reset input of the control flip-flop 51 and the output of the last stage 207 of the binary counter 53. As already explained, the pulses from the pulse source 52 supplied to the pulse amplifiers 193 and 194 are supplied through the shifting bars 203, 204 and 205 of the shift register 32 simultaneously with supply through the conductor 206 to the binary counter 53. The shift register in the example illustrated is shifted exactly 28 times in order to clear the register completely and transmit all the information to the ground station.

Upon receipt of the 28 shifting pulses, the counter 53 emits an over flow signal supplied through a conductor 214 to the reset input of the shifting flip-flop of the shift register.

Upon receipt of the 28 shifting pulses, the counter emits its over flow signal to the conductor 214. The change in voltage level is amplified by the pulse amplifier 213 and used to reset the control flip-flop 51. The output of the amplifier 213 is connected to the reset terminal 156 of the control flip-flop 51. This removes the positive level from the oscillator 52 and causes it to cease functioning.

Each of the shifting flip-flops such as the shifting flip-flop 108 shown in FIG. 3 is provided with a shift bar or shifting terminal 215 which is coupled to the base of the transistor 118 through a condenser 216 and a rectifier 217. The shift terminals such as the terminal 215 are connected to the shift bars 203, 204 and 205.

Figure 14:
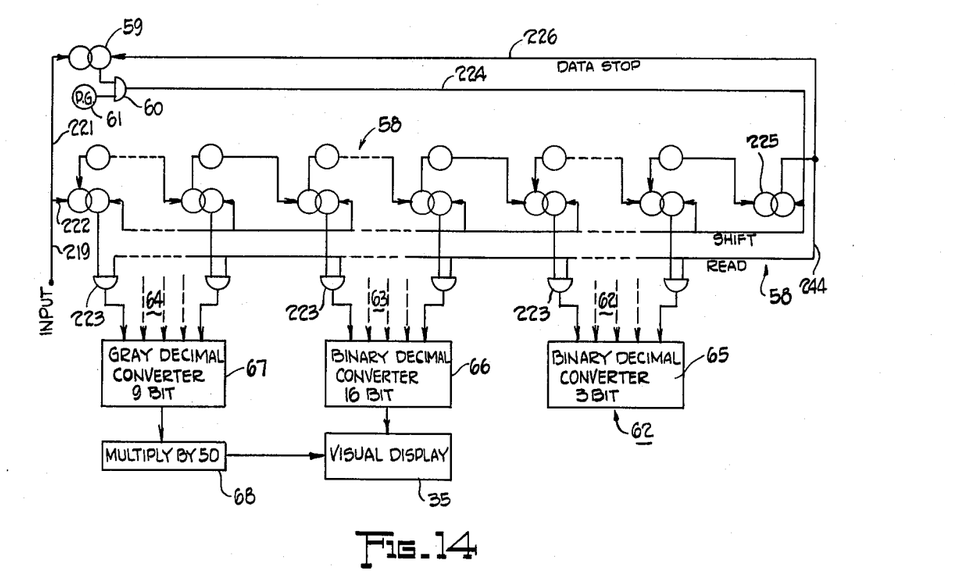
FIG. 14 is a schematic diagram illustrating the ground station logic.

FIG. 14 illustrates the logic circuits employed for the ground station when the interrogation signal is a single pulse, but it will be understood that the invention does not exclude the use of a coded series of pulses for the interrogation signal. For simplification it has also been assumed that the last bit in the airborne identification logic would always be a binary "1." In actual practice this would not necessarily be true and to avoid the necessity for making this assumption, an extra bit may be placed at the rightmost end of the shift register into the register along with the preset identification information. Such piece of information may be called the data stop bit. Its purpose will become evident in the discussion concerning the logical functions to be performed by the ground station.

As shown in FIGS. 1, 2 and 14, the ground station apparatus is arranged to provide the operator with a visual display of the information being sent from the aircraft to the control tower or ground station. The optical display device 35 may consist of Nixie tubes, for example. The input information is the data received by the ground based receiver 26 from the aircraft 16. Said input channel 219 has branch outputs 221 to the control flip-flop 59 and 222 to the shift register 58. For this purpose the shift register 58 is a 29 stage register. A plurality of "and" gates are provided, one for each of the stages of the shift register 58 with one input to each of the "and" gates 223 from one of the stages of the shift register 58, and the other input through a line 224 from the "and" gate 60 which is fed by the pulse generator 61 and the control flip-flop 59. As shown where a 9-bit gray code is employed for the altitude signal, nine of the "and" gates 223 are connected to the decimal converter 67. Likewise for the aircraft serial number identification, sixteen stages are connected to the 16-bit binary decimal converter 66 and for type identification three of the shift register flip-flop stages are connected to the binary-decimal converter 65. The 29th flip-flop stage 225 is for supplying a data stop signal through a line 226 to the reset terminal of the control flip-flop stage 59.

Figure 15:
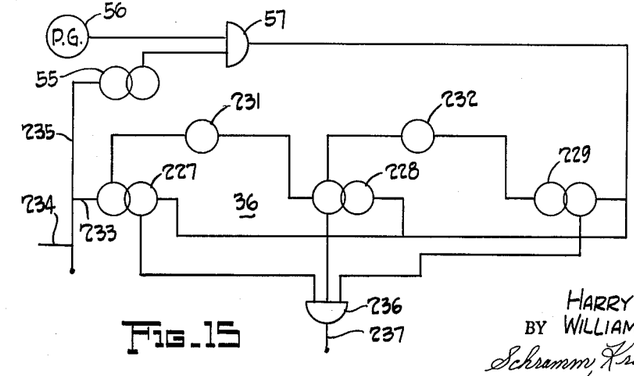
FIG. 15 is a circuit diagram of alternative airborne input circuitry which may be employed when it is desired to render the mobile equipment responsive only to predetermined coded pulses instead of to any single pulse directed towards the mobile aircraft.

If it is desired to employ a coded interrogation signal instead of a single pulse interrogation signal, a suitable input register such as illustrated in FIG. 15 is employed. For the code "101," the input register 36 comprises three standard flip-flops 227, 228 and 229 with interstage delay elements 231 and 232 supplied through a branch 233 of an input line 234 from the receiver 21. A second branch 235 of the line from the receiver output line 234 is supplied through the control flip-flop 55. For the code "101," output lines from the "1" side of the flip-flops 227 and 229 and from the "0" side of the flip-flop 228 are supplied through a three-legged "and" gate 236 having an output line 237 with the branches 37, 38 and 39 shown in FIG. 2.

Where the control tower 11 is provided with mechanism for continuously sweeping the radar dish 12 and the pulse transmitter antenna 18 in azimuth, and a continuously operating transmitter 17 is provided, an interrogation signal is supplied to an airplane 16 each time such an airplane comes within the field of the narrow beams of the antenna 12 and 18. But it will be understood that the invention is not limited to this arrangement and does not exclude a conventional radar tracking system in which the radar dish 12 and consequently also the pulse antenna 18 lock on an aircraft 16 when one is there, located by the radar system. Whichever system is employed the interrogation signal supplied to the aircraft 16 initiates a chain of operations which produces the record on the display 35 at the control tower.

The delivery of an interrogation signal through the line 237 from the receiver 21, closing the switch 140 by a relay (not shown), actuates the relay 84 of FIG. 9 to energize the lamp-triggering circuit 41 and the preset identification circuity 31. The pulses through the line 131 of FIG. 9 set the shifting flip-flops of the shift register 32 to provide the digital information as to serial number and type of the aircraft and the pulse through the line 131 also initiates the supply of setting pulses through the amplifier units 117 to the gray-code altitude-indicating flip-flops 108 to 116 inclusive.

The circuits of these flip-flops are the same internally as those of the flip-flops 238 of the identification and type portion of the shift register 32, circuits for which are shown in FIG. 3. The actuation of the delay device 49 and the production of a rise in voltage 239 on the input terminal 105 of the Schmitt trigger, as shown in FIG. 12, results in the supply of a rising voltage 241 to the set in terminal 107 of a shifting flip-flop as illustrated in FIG. 3. Likewise a rising voltage occurs on the set in terminal 242 of such of the input register flip-flops 238 as has its switch 129 closed. Accordingly, for each shifting flip-flop which receives a "one" bit on its set in terminal 107, this information is set in to the flip-flop circuit. After the time delay determined by the delay device 49, delayed shifting pulses from the oscillator 52 are supplied over the branch control lines 191 and 192, triggering the pulse amplifiers 194 and 193 to the shift bars 203, 204 and 205. Such positive pulses suplied on terminals such as the terminal 215 shown in FIG. 3 of each shifting flip-flop cause successive transfer of the information from one flip-flop to the next and out through the output terminal 243 of the delay flip-flop 116 corresponding to the set out terminal 123 of the stage 108, such output pulses serve for keying the transmitter 24 of FIG. 2 and transmitting the coded pulses back to the antenna 27 of the ground station. This action takes place until the binary counter 53 has counted out the requisite number of bits to shift all the information out of the shift register.

It will be understood that by reason of the previous interrogation signal, the shift register 58 of the ground station will have been cleared before receiving the new input data, the twenty-nine stages being normally in the zero state. When the data stop bit is finally shifted into the 29th stage, the conduction stage changes. The set or "1" output is used to reset the control flip-flop 59 thereby inhibiting the two-legged "and" gate 60. At the same time the 29th stage output is fed through twenty-eight two-legged "and" gates 223 which may be referred to as the read gates. This output is received over a read line 244. The input through the line 244 enables the read gates. The other, or second, input through each of the gates 223 is the "1" or set output of the respective register stages.

Thus, upon receipt of the read signal the content of all stages of the register are read out in parallel. The outputs are arranged such that the altitude signal, included in the first nine stages, is fed to a 9-bit gray code to decimal converter 67; the identification signal or output of the next sixteen stages is fed to a 16-bit binary decimal converter 66; the type signal or output of the next three stages is fed to the 3-bit binary to decimal converter 65.

The decoded (now in decimal code) altitude information is next multiplied by a scalar of 50 by the multiplier 68 in order to give an actual decimal altitude indication.

Finally, the outputs are fed to the visual display mechanism, such as the previously mentioned Nixie tubes, in a visual display 35 or a typewriter which will respond to electrical inputs.

Certain embodiments of the invention and certain methods of operation embraced therein have been shown and described for the purpose of explaining the principle of operation of the invention and showing its application, but it will be obvious to those skilled in the art that many modifications and variations are possible, and it is aimed therefore to cover all such modifications and variations as fall in the scope of the invention.

What is claimed is:

1. In combination with an aircraft, an altimeter mounted therein having a member movable in response to variations in altitude of the aircraft, transducer connected to said movable member for converting the motion thereof into digital electrical signals forming altitude data and thereby representing altitude and dependent upon position of said movable member, a shift register connected to said transducer to receive said electrical signals and having electro-responsive elements therein for temporary storage of said electrical signals forming said altitude data and a read-out device for indicating the signals stored in the shift register.

2. Apparatus as in claim 1 wherein the means for converting motion of the altimeter movable member into digital electrical signals comprises a coding device with a digital pattern thereon having successive sectors each with a different pattern arrangement to represent a different digit and electrical means responsive to successive sectors of the coding device as the movable member is moved for producing digital signals forming altitude data and representing altitude.

3. Apparatus as in claim 2 wherein the digital pattern on the coding device is optical, in the form of a pattern of light and dark portions, and the apparatus includes means for illuminating a sector of the pattern according to the position of the device and the electrical means responsive to differences in the pattern constitute photosensitive means responsive to the portion of the pattern illuminated by said illuminating device.

4. An altimeter comprising in combination a member movable in response to variations in altitude, a translucent coded plate carried by said member, a linear light source on one side of said translucent plate, said plate having a coded pattern thereon of opaque and translucent portions whereby the light transmitted through the plate from the light source varies in arrangement in accordance with variations in position of said movable member in response to variations in altitude, and a detector plate mounted adjacent to said translucent plate on the opposite side thereof from said light source comprising a plurality of electro-responsive light detectors in alignment parallel to the alignment of the linear light source, whereby the relative amount of light reaching different detectors of said detector plate varies with the position of the translucent plate and variations in a portion of the pattern thereof exposed to the light source.

5. Apparatus as in claim 4 wherein the translucent plate has a digital code pattern thereon with successive rows of patterns, each having progressively different numbers of light and dark spots in the row and the number of detectors in the detector plate corresponds to the number of rows in the pattern and the response of the detectors of the detector plate represents a series of bits of the digital code.

6. Apparatus as in claim 4 wherein a light focusing window is interposed between the detector plate and the translucent plate having a number of light focusing windows corresponding to the number of detectors of the detector plate, each light focusing window being aligned with one of said detectors.

7. In an aircraft altimeter system a lamp, a lamp triggering circuit responsive to interrogation signals, an altimeter having a coded plate movable in response to variations in altitude exposed to the illumination of said lamp, and light detectors variably responsive to the illumination of said coded plate by said lamp according to the position of the coded plate, said lamp and plate being arranged to limit illumination of the plate to a portion thereof differing with changes in position of the plate, said plate having a coded pattern thereon of light and dark portions varying in pattern from one portion of the plate to the next and arranged to produce a pattern of illumination of said light detectors from said plate varying with the position of the plate, the detectors comprising a plurality of electro-responsive light detectors arranged to correspond to the portion of the plate illuminated in any position thereof, whereby the relative amount of light reaching different detectors varies with the position of the plate and variation in the portion of the pattern thereof exposed to the illumination of the lamp.

8. In an aircraft altimeter system a shift register comprising a plurarility of bi-stable circuits connected as successive stages, an altimeter with a digital encoding disk connected thereto movable in response to variations in altitude, means for converting variations in position of the coding disk into electrical signals, means for applying said electrical signals to said successive stages of the bi-stable circuits for setting each of the stages of said bi-stable circuits according to the electrical signals produced by the encoding device for filling said bi-stable circuits with digitally arranged information as to the altitude of the aircraft.

9. Apparatus as in claim 8, having means for reading out the information from the bi-stable circuits.

References Cited by the Examiner
UNITED STATES PATENTS

| | | | |
|---|---|---|---|
| 2,421,106 | 5/1947 | Wight et al. | 343—6 |
| 2,542,825 | 2/1951 | Mesa | 343—6.5 |
| 2,618,157 | 11/1952 | Keeling | 73—386 |
| 2,690,556 | 9/1954 | Marshall | 343—13 |
| 2,743,430 | 4/1956 | Schultz et al. | 250—212 X |
| 2,941,088 | 6/1960 | Mahaney | 250—233 |
| 2,949,779 | 8/1960 | McKenney et al. | 73—384 |
| 2,999,235 | 9/1961 | Von Segeboden | 343—7.4 |
| 3,011,061 | 11/1961 | Dickinson | 250—237 |
| 3,016,470 | 1/1962 | Van Dine | 307—88.5 |
| 3,035,185 | 5/1962 | Schwenker | 307—88.5 |

RICHARD C. QUEISSER, *Primary Examiner.*

C. L. JUSTUS, *Examiner.*